US009602345B2

(12) United States Patent
Saha et al.

(10) Patent No.: US 9,602,345 B2
(45) Date of Patent: Mar. 21, 2017

(54) PERFORMANCE OPTIMIZATIONS FOR WIRELESS ACCESS POINTS

(71) Applicant: Accenture Global Services Limited, Dublin (IE)

(72) Inventors: Vivek Saha, Haryana (IN); Arnab Chakraborty, Frankfurt (DE); Brian S. Jakubowski, Raleigh, NC (US); Rajan Shingari, New Delhi (IN); Ankit Jain, New Delhi (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 143 days.

(21) Appl. No.: 14/538,938

(22) Filed: Nov. 12, 2014

(65) Prior Publication Data

US 2015/0341211 A1     Nov. 26, 2015

(30) Foreign Application Priority Data

May 23, 2014   (IN) .......................... 2549/CHE/2014

(51) Int. Cl.
| | | |
|---|---|---|
| *G06F 15/177* | (2006.01) | |
| *H04L 12/24* | (2006.01) | |
| *H04W 88/08* | (2009.01) | |
| *G05B 13/04* | (2006.01) | |
| *H04W 24/02* | (2009.01) | |
| *H04W 84/12* | (2009.01) | |

(52) U.S. Cl.
CPC ........ *H04L 41/0813* (2013.01); *G05B 13/048* (2013.01); *H04L 12/24* (2013.01); *H04W 24/02* (2013.01); *H04W 88/08* (2013.01); *H04W 84/12* (2013.01)

(58) Field of Classification Search
None
See application file for complete search history.

(56) References Cited

U.S. PATENT DOCUMENTS 7,761,918 B2 *   7/2010   Gula ................... H04L 63/1408
                                                           709/223
7,823,155 B2 *   10/2010   Misra ..................... H04L 43/12
                                                           709/224

(Continued)

OTHER PUBLICATIONS

Extended European Search Report dated Oct. 30, 2015, issued on European Application No. 151616.28.1 filed on Mar. 30, 2015, 8 pages, European Patent Office.

*Primary Examiner* — Jeffrey R Swearingen
(74) *Attorney, Agent, or Firm* — Mannava & Kang, P.C.

(57) ABSTRACT

In an example, a performance of an access point in a wireless network is optimized based on a statistical ranking of independent variables. A device analyzer may calculate a dependent variable for the performance of the access point and independent variables that impact the dependent variable from a set of independent variables based on real-time access point data received from a plurality of access points. A predictive modeler may generate a model to forecast the performance of the access point and to determine an impact ranking for the independent variables from the dependent and independent variables. The impact ranking may sequence the independent variables according to their impact on the dependent variable. Accordingly, a configuration circuit may adjust a controllable parameter of the access points according to the impact ranking.

18 Claims, 11 Drawing Sheets

(56) References Cited

U.S. PATENT DOCUMENTS

| | | | |
|---|---|---|---|
| 2005/0233799 A1* | 10/2005 | LeMay | G07F 17/32 463/20 |
| 2013/0142183 A1 | 6/2013 | Lee et al. | |
| 2013/0143592 A1 | 6/2013 | Brisebois et al. | |
| 2014/0036691 A1 | 6/2014 | Madan et al. | |
| 2015/0244645 A1* | 8/2015 | Lindo | H04L 47/823 709/224 |

* cited by examiner

500

The REG Procedure
Model: MODEL1
Dependent Variable: avg_lat

| Number of Observations Read | 17062 |
|---|---|
| Number of Observations Used | 4840 |
| Number of Observations with Missing Values | 12222 |

510

Analysis of Variance

| Source | DF | Sum of Squares | Mean Square | F Value | Pr > F |
|---|---|---|---|---|---|
| Model | 7 | 572579968 | 81797138 | 36.83 | <.0001 |
| Error | 4832 | 10731333095 | 2220888 | | |
| Corrected Total | 4839 | 11303912063 | | | |

| Root MSE | 1490.26449 | R-Square | 0.0507 |
|---|---|---|---|
| Dependent Mean | 870.02120 | Adj R-Sq | 0.0493 |
| Coeff Var | 171.29060 | | |

520

Parameter Estimates

| Variable | DF | Parameter Estimate | Standard Error | t Value | Pr > |t| | Variance Inflation |
|---|---|---|---|---|---|---|
| Intercept | 1 | 1351.04087 | 43.92379 | 30.76 | <.0001 | 0 |
| count_session | 1 | 1.75842 | 0.81362 | 2.16 | 0.0307 | 1.05195 |
| wgt_AvgTxThrpt | 1 | -0.00008761 | 0.00011369 | -0.77 | 0.4410 | 1.02156 |
| avg_bw | 1 | -0.00014296 | 0.00000945 | -15.04 | <.0001 | 1.02484 |
| avg_session_drtn | 1 | -0.00005484 | 0.00004532 | -1.19 | 0.2331 | 1.14713 |
| min_comp_networks | 1 | -24.65794 | 43.32227 | -0.57 | 0.5693 | 1.04070 |
| avg_rx | 1 | -4.40426E-7 | 0.00000147 | -0.30 | 0.7648 | 1.21733 |
| wgt_AvgRxThrpt | 1 | -0.00006897 | 0.00003722 | -1.85 | 0.0639 | 1.26817 |

The REG Procedure
Model: MODEL14
Dependent Variable: avg_lat

| Number of Observations Read | 17062 |
|---|---|
| Number of Observations Used | 5756 |
| Number of Observations with Missing Values | 11306 |

510

Analysis of Variance

| Source | DF | Sum of Squares | Mean Square | F Value | Pr > F |
|---|---|---|---|---|---|
| Model | 6 | 1942879390 | 323813232 | 107.74 | <.0001 |
| Error | 5749 | 17278342429 | 3005452 | | |
| Corrected Total | 5755 | 19221221819 | | | |

| Root MSE | 1733.62389 | R-Square | 0.1011 |
|---|---|---|---|
| Dependent Mean | 1872.83449 | Adj R-Sq | 0.1001 |
| Coeff Var | 161.59286 | | |

520

Parameter Estimates

| Variable | DF | Parameter Estimate | Standard Error | t Value | Pr > |t| | Variance Inflation |
|---|---|---|---|---|---|---|
| Intercept | 1 | 5731.95777 | 275.65189 | 20.79 | <.0001 | 0 |
| r_count_session | 1 | 11.98103 | 4.73946 | 2.53 | 0.0115 | 1.02473 |
| r_min_comp_networks | 1 | -32.00798 | 33.58160 | -0.95 | 0.3406 | 1.01016 |
| r_avg_rx | 1 | 101.82507 | 30.14605 | 3.38 | 0.0007 | 3.66060 |
| r_wgt_AvgRxThrpt | 1 | -180.97609 | 39.65708 | -4.56 | <.0001 | 3.47516 |
| r_avg_bw | 1 | -278.03289 | 12.97239 | -21.43 | <.0001 | 1.19941 |
| r_avg_session_drtn | 1 | -1.5962E-10 | 1.3016E-10 | -1.23 | 0.2201 | 1.28633 |

The REG Procedure
Model: MODEL21
Dependent Variable: avg_lat

| | |
|---|---|
| Number of Observations Read | 17062 |
| Number of Observations Used | 5756 |
| Number of Observations with Missing Values | 11306 |

510

Analysis of Variance

| Source | DF | Sum of Squares | Mean Square | F Value | Pr > F |
|---|---|---|---|---|---|
| Model | 6 | 2202976827 | 367162805 | 124.03 | <.0001 |
| Error | 5749 | 17018244992 | 2960210 | | |
| Corrected Total | 5755 | 19221221819 | | | |

| | | | |
|---|---|---|---|
| Root MSE | 1720.52597 | R-Square | 0.1146 |
| Dependent Mean | 1072.63449 | Adj R-Sq | 0.1137 |
| Coeff Var | 160.37198 | | |

520

Parameter Estimates

| Variable | DF | Parameter Estimate | Standard Error | t Value | Pr > |t| | Variance Inflation |
|---|---|---|---|---|---|---|
| Intercept | 1 | 8524.36392 | 351.37296 | 24.26 | <.0001 | 0 |
| r_avg_bw | 1 | -440.95520 | 21.00105 | -21.00 | <.0001 | 1.23861 |
| r_count_session | 1 | -20.21632 | 8.10550 | -2.49 | 0.0127 | 1.07858 |
| r_avg_rx | 1 | 92.43559 | 35.49648 | 2.60 | 0.0092 | 2.57936 |
| r_wgt_AvgRxThrpt | 1 | -133.50397 | 36.05827 | -3.70 | 0.0002 | 2.78975 |
| r_avg_session_drtn | 1 | -7.96101E-9 | 3.378779E-9 | -2.36 | 0.0185 | 1.03963 |
| os_4_1_andup | 1 | -653.55856 | 67.44767 | -9.69 | <.0001 | 1.02727 |

PERFORMANCE OPTIMIZATIONS FOR WIRELESS ACCESS POINTS

BACKGROUND

In computer networking, a wireless access point is a device that allows wireless devices to connect to a wired network to form a wireless local area network (WLAN). An access point typically connects directly to a wired Ethernet connection and provides wireless connections using radio frequency (RF) links (e.g., Wi-Fi, Bluetooth, or other related standards) for other devices to utilize the wired connection. An access point may support the connection of multiple wireless devices to one wired connection.

Access points have wide application in corporate, public, educational, and home WLANs. A typical WLAN may include several access points attached to a wired network to provide devices with wireless access to the Internet or another wide area network. A hotspot is a public application of access points where wireless clients can connect to the Internet without regard for the particular networks to which they have attached for the moment. Further, access points are commonly used in home wireless networks to wirelessly connect all the computers in a home or office. The performance of access points can vary significantly depending on a combination of network, geographical, and hardware variables.

BRIEF DESCRIPTION OF THE DRAWINGS

Features of the present disclosure are illustrated by way of example and not limited in the following figure(s), in which like numerals indicate like elements, in which:

FIG. 5 shows an output for an initial iteration of a statistical regression analysis on a first model with latency as a dependent variable, according to an example of the present disclosure;

FIG. 6 shows an output for a fourteenth iteration of a statistical regression analysis on a fourteenth model with latency as a dependent variable, according to an example of the present disclosure;

FIG. 7 shows an output for a final iteration of a statistical regression analysis on a twenty-first model with latency as a dependent variable, according to an example of the present disclosure;

DETAILED DESCRIPTION

Figure 1:
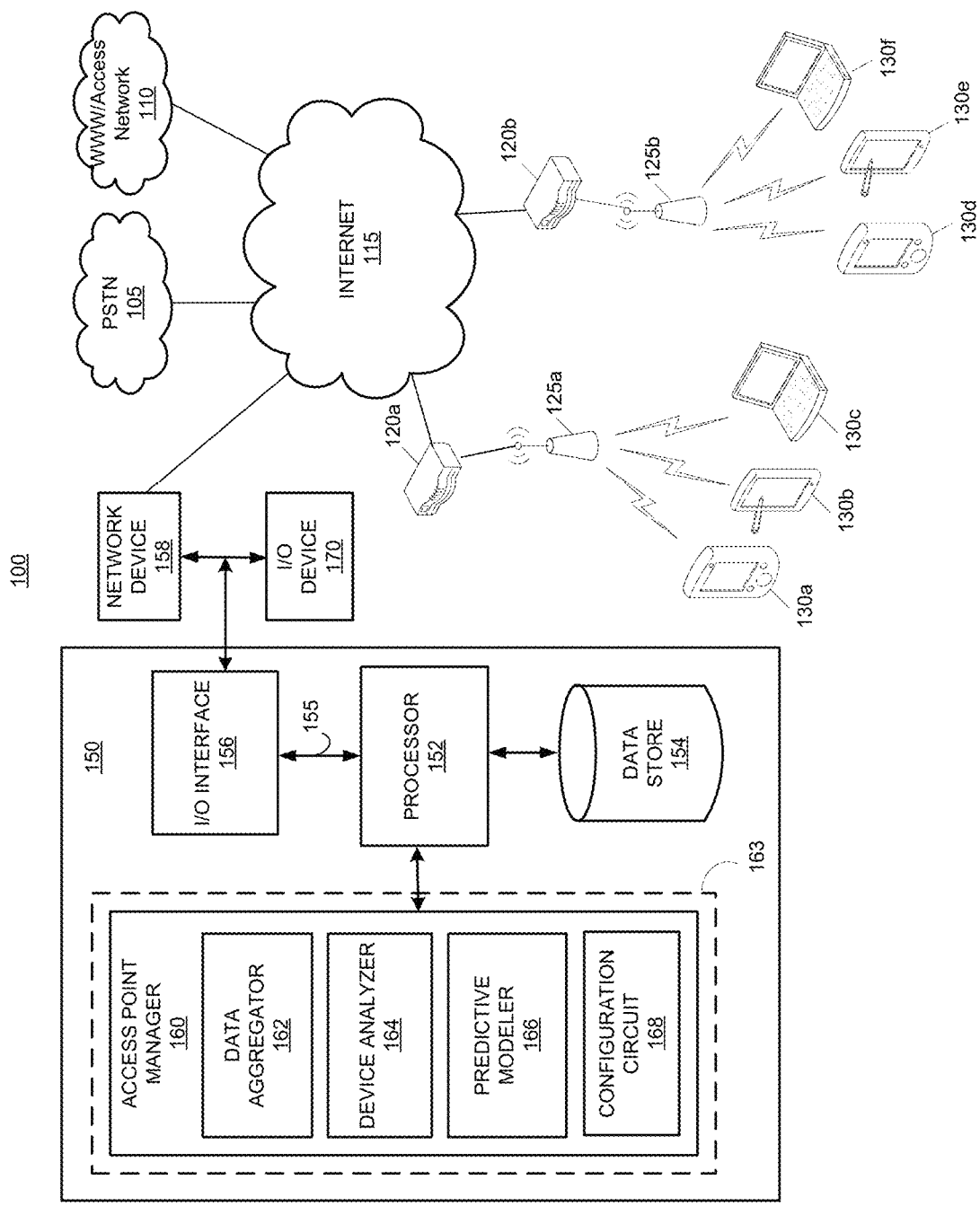
FIG. 1 shows a system diagram of an intelligent insight platform to optimize a performance of an access point based on a complex and iterative statistical regression analysis of independent variables according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are examples of a method to optimize the performance of access points in a wireless local area network (WLAN) based on a statistical ranking of independent variables. Also disclosed herein is a system for implementing the methods and a non-transitory computer readable medium on which is stored machine readable instructions that implement the methods.

Variables in the statistical modeling of the disclosed examples may be divided into a dependent variable and independent variables. The dependent variable represents a tested output or effect on the access point performance and the quality of service for transmission over the WLAN. For example, a dependent variable may include, but is not limited to, latency, signal strength, or throughput at the access point. The independent variables represent the tested inputs or causes for the access point performance and the quality of service for transmission over the WLAN. Examples of the independent variables are further described below in Table 1.

According to a disclosed example, a device analyzer may calculate a dependent variable for the performance of the access point and independent variables that impact the dependent variable from a set of independent variables based on real-time access point data received from a plurality of access points. A predictive modeler may generate a model to forecast the performance of the access point and to determine an impact ranking for the independent variables from the dependent and independent variables. The impact ranking may sequence the independent variables according to their impact on the dependent variable. Accordingly, a configuration circuit may adjust a controllable parameter of the access points according to the impact ranking.

Contemporary network monitoring tools and procedures typically require a WLAN administrator to undergo a timeconsuming process to interpret large sets of output data from a vast number of access points from many different locations and categories of client businesses and possibly identify causes of degradation of network quality of service provided by the access points. Once the WLAN administrator eventually identifies a set of underperforming access points from a particular location or category, the WLAN administrator must be reactive in adjusting parameters for the underperforming access points, which may have already negatively impacted the customer experience. Moreover, the WLAN administrator must rely on network expertise and educated guesses to determine which parameters or variables should be adjusted to improve the performance of the underperforming access points.

The disclosed examples provide technical solutions to the problems associated with optimizing the performance of access points in a network by providing a data aggregator to quickly and efficiently monitor, aggregate, and summarize a vast amount of real-time access point data to create a continually updated network analytic record. Based on the continuously updated wireless network analytic record, a device analyzer may calculate access point performance across many different regions and divisions and display a summary of the access point performance at the different levels to swiftly provide an easy visual identification of the underperforming access points. Moreover, the disclosed examples provide enhanced customer experience through load forecasting and bandwidth optimization. That is, a predictive modeler may generate a model to predict the performance of access points in the network and determine an impact ranking to evaluate the interrelationships and trends for different variables on the performance of the access points. Accordingly, the generated model may be deployed by a configuration circuit 168 to proactively adjust the key high impact parameters of the access points to optimize their performance and to reduce future network operational issues.

Thus, the disclosed examples improve access point performance by optically drilling down to a problem area, analyzing key trends across each of the dominating factors for performance degradation or latency, and statistically forecasting capacity to optimize the bandwidth reaching the access points.

With reference to FIG. 1, there is shown a system diagram of an intelligent insight platform 100 to optimize the performance of an access point based on a complex and iterative statistical regression analysis of independent variables according to an example of the present disclosure. It should be understood that the intelligent insight platform 100 may include additional circuits and that one or more of the circuits described herein may be removed and/or modified without departing from a scope of the intelligent insight platform 100.

Referring to FIG. 1, an example of the intelligent insight platform 100 may have connectivity to different network types, including a public switched telephone network (PSTN) 105, the World Wide Web (WWW) or access network 110, the Internet 115, routers 120a-b, access points 125a-b, and wireless devices 130a-f.

The wireless devices 130a-f (i.e., access point clients) may include personal digital assistants (PDAs), mobile phones, tablets, laptops, and other wireless mobile devices. By way of example, and not by way of limitation, wireless devices 130a-c may connect to access point 125a and wireless devices 130d-f may connect to access point 125b using various radio frequency (RF) protocols, such as a global system for mobile general packet radio service (GSM GPRS), an evolution data only (EV-DO), Bluetooth, Wi-Fi, to access a wireless land area network (WLAN). That is, access points 125a-b may provide wireless devices 130d-f with wireless access to a wired Ethernet network.

According to an example, access point 125a may connect to router 120a and access point 125b may connect to router 120b to provide wireless devices 130a-f with access to the Internet 115. Routers 120a-b may provide additional built-in security, such as a firewall. Access points 125a-b may, for example, be incorporated in routers 120a-b as a single device or provided as a separate device to provide the wireless devices 130d-f with access to the Internet 115. Thus, access points 125a-b may provide a wireless to wireline connection for access to the Internet 115 and may be a wireless "hot-spot" such as a Bluetooth or Wi-Fi access point in a public location according to an example. According to an example, each of the access points may include a controller to receive instructions and locally set controllable parameters according to the instruction. The Internet 115 may have various connections to the PSTN 105, the WWW 110, and a WLAN intelligent server 101, for instance, through gateways using the Transmission Control Protocol/Internet Protocol (TCP/IP).

The access point management server 150 is depicted as including a processor 152, a data store 154, an input/output (I/O) interface circuit 156, and an access point manager 160. For example, the access point management server 150 may be a desktop computer, a laptop computer, a smartphone, a computing tablet, or any type of computing device. Also, the circuits of the access point management server 150 are shown on a single computer as an example and in other examples the circuits may exist on multiple computers. The access point management server 150 may optimize the performance of access points 125a-b based on a statistical ranking of independent variables in a separate computing device, for instance, through a network device 158, which may include, for instance, a router, a switch, a hub, and the like. The data store 154 may include physical memory such as a hard drive, an optical drive, a flash drive, an array of drives, or any combinations thereof, and may include volatile and/or non-volatile data storage.

The access point manager 160 is depicted as including a data aggregator 162, a device analyzer 164, a predictive modeler 166, and a configuration circuit 168. The processor 152, which may be a microprocessor, a micro-controller, an application specific integrated circuit (ASIC), or the like, is to perform various processing functions in the access point management server 150. The processing functions may include the functions of circuits 162-168 of the access point manager 160. According to an example, the access point manager 160 may optimize the performance of access points based on a statistical ranking of independent variables to optimize a performance of an access point in a wireless network based on a statistical ranking of independent variables.

The data aggregator 162, for example, may aggregate and enrich vast amounts of real-time access point data that are output from a plurality of data sources. The data aggregator 162 may then summarize, transform, and enrich the real-time access point data to create a wireless network analytic record for all of the access points in a network.

The device analyzer 164, for example, may calculate a dependent variable for the performance of the access point based on the real-time access point data received from the data aggregator. The performance of the access point may include a connection success rate for the access point and a quality of connection of the access point. The device analyzer 164 may then calculate independent variables that impact the dependent variable from a set of independent variables. According to an example, the device analyzer 164 may identify underperforming (e.g., high-latency) access points in the wireless network based on a network analytic record to determine the dependent variable and the independent variables based on the identification of the underperforming access points. The device analyzer 164 may then output the calculated variables to the predictive modeler 166 to generate a model.

The predictive modeler 166, for example, may generate a model to forecast the performance of the access point based on the calculated variables outputted from the device analyzer 164. The model may be generated using a stepwise regression analysis to test all combinations of the independent variables during multiple iterations of the model. The predictive modeler 166 may also determine an impact ranking for the independent variables outputted from the device analyzer. The impact ranking may sequence the independent variables according to their impact on the dependent variable.

The configuration circuit 168, for example, may adjust a controllable parameter of the access points according to the impact ranking. The configuration circuit 168 may adjust the controllable parameter according to a user-selected a geographical region.

In an example, the access point manager 160 includes machine readable instructions stored on a non-transitory computer readable medium 163 and executed by the processor 152. Examples of the non-transitory computer readable medium include dynamic random access memory (DRAM), electrically erasable programmable read-only memory (EEPROM), magnetoresistive random access memory (MRAM), memristor, flash memory, hard drive, and the like. The computer readable medium 163 may be included in the data store 154 or may be a separate storage device. In another example, the access point manager 160 includes a hardware device, such as a circuit or multiple circuits arranged on a board. In this example, the circuits 162-168 are circuit components or individual circuits, such as an embedded system, an ASIC, or a field-programmable gate array (FPGA).

The processor 152 may be coupled to the data store 154 and the I/O interface circuit 156 by a bus 155 where the bus 155 may be a communication system that transfers data between various circuits of the access point management server 150. In examples, the bus 105 may be a Peripheral Component Interconnect (PCI), Industry Standard Architecture (ISA), PCI-Express, HyperTransport®, NuBus, a proprietary bus, and the like.

The I/O interface circuit 156 includes a hardware and/or a software interface. The I/O interface circuit 156 may be a network interface connected to the Internet 115 through the network device 158, over which the access point manager 160 may receive and communicate information. For example, the I/O interface circuit 156 may be connected to a plurality of wireless local area networks (WLANs) and may receive real-time access point data from a plurality of access points 125*a-b* in the WLANs.

The I/O interface circuit 156 may be a wireless local area network (WLAN) or a network interface controller (NIC). The WLAN may link the access point management server 150 to the network device 158 through a radio signal. Similarly, the NIC may link the access point management server 150 to the network device 158 through a physical connection, such as a cable. The access point management server 150 may also link to the network device 158 through a wireless wide area network (WWAN), which uses a mobile data signal to communicate with mobile phone towers. The processor 152 may store information received through the I/O interface circuit 156 in the data store 154 and may use the information in implementing the circuits 162-168.

The I/O interface circuit 156 may be a device to connect the access point management server 150 to one or more I/O devices 170. The I/O devices 170 include, for example, a display, a keyboard, a mouse, and a pointing device, wherein the pointing device may include a touchpad or a touchscreen. The I/O devices 170 may be built-in circuits of the access point management server 150, or located externally to the access point management server 150. The display may be a display screen of a computer monitor, a smartphone, a computing tablet, a television, or a projector.

Figure 2:
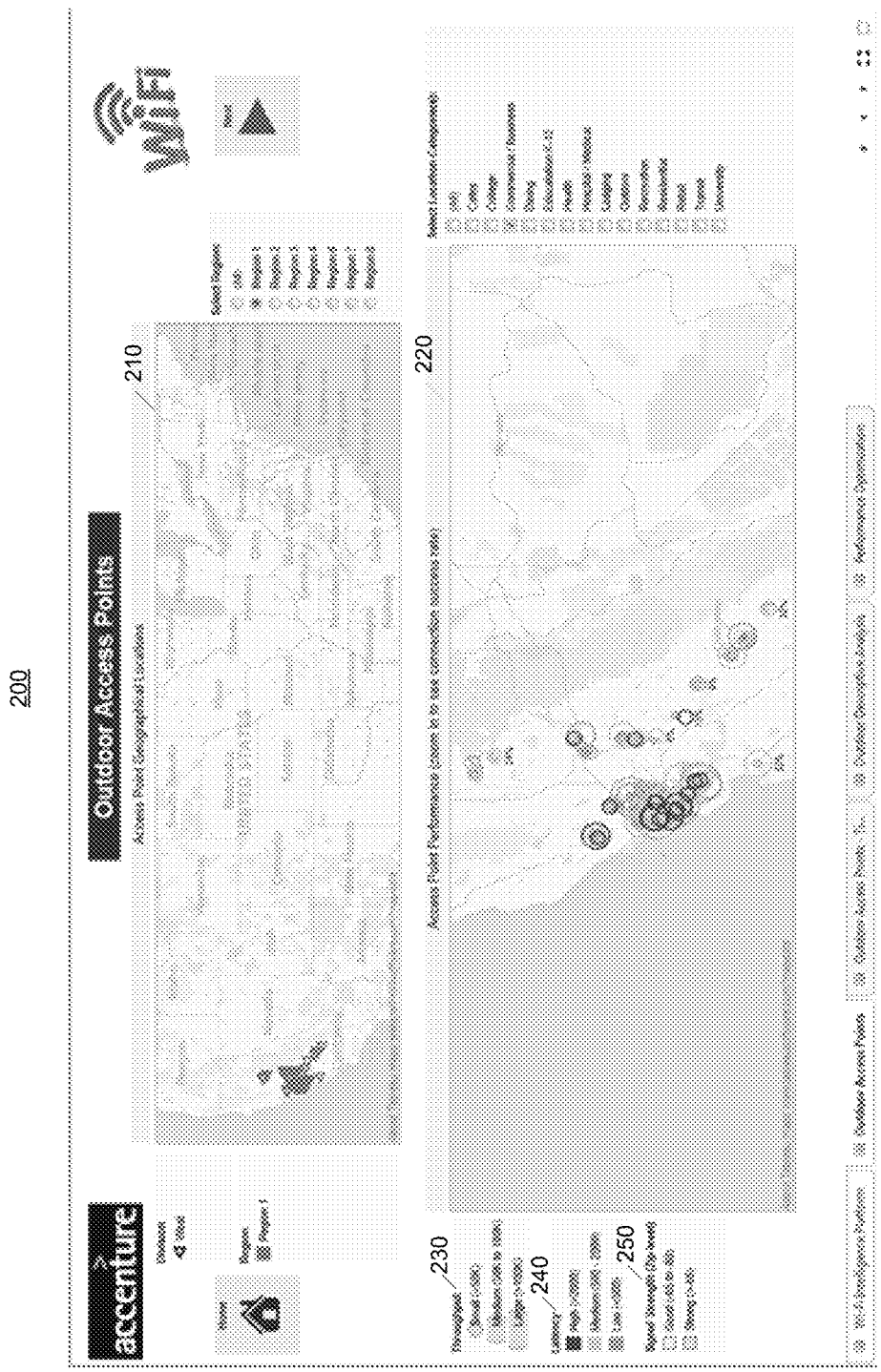
FIG. 2 shows a graphical user interface for displaying geographical and performance insights for access points in a network, according to an example of the present disclosure.
Figure 3:
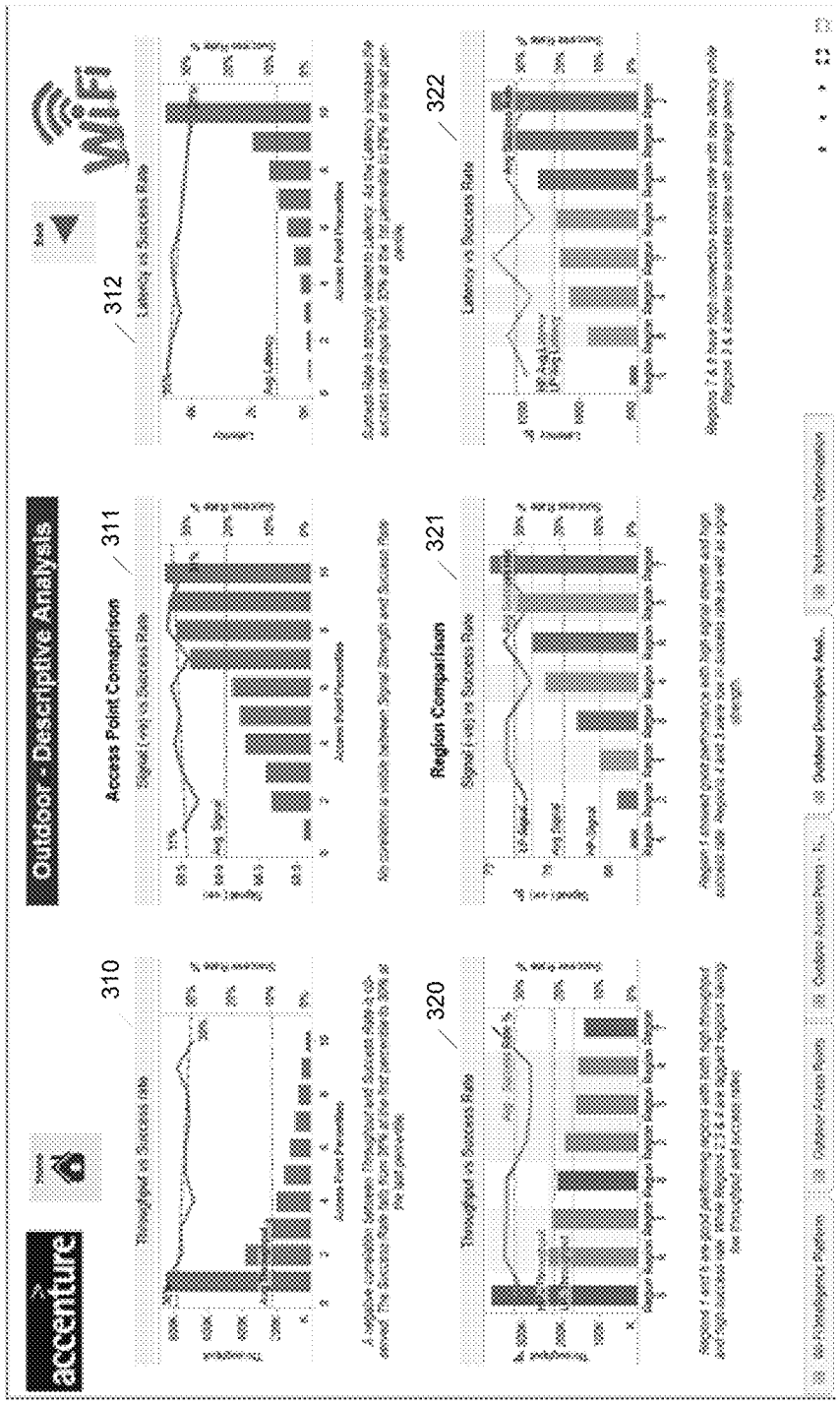
FIG. 3 shows a graphical user interface for displaying a descriptive analytics comparison of access points in the network, according to an example of the present disclosure.

With reference to FIGS. 2 and 3, there are shown graphical user interfaces 200 and 300 for displaying insights into access point performance in a network according to an example of the present disclosure. The access point performance may include at least one of a latency, connection success rate for an access point and a quality of connection of an access point. According to an example, the data aggregator 162 may input vast amounts of real-time access point data that is output from a plurality of data sources to create a wireless network analytic record for all of the access points in the WLAN.

The real-time access point data may include, for instance, access point session data, access point location data, access point profile data, statistical data, and functional data. The access point session data may be received from individual access points and routers and may include session level information such as signal strength, session start time, session duration, data transferred, connection, bandwidth and the like. The access point location data may be received from a master file and may include a location of an access point (e.g. latitude and longitude), an arial type (e.g., indoor or outdoor), and the like. The access point profile data may be received from a master service log and may include access point hardware and software information, a data of installation, a service data of an access point, and connected node information. The statistical data may be received from a statistical subject matter expert and may include enriched data to create more meaningful data. For example, the statistical data may include, but is not limited to, a number of client connections to an access point in a 4 hour window, a total amount of data transferred from an access point during a day. The functional data may be received from a functional subject matter expert and may provide additional data regarding performance management including an optimum latency operating band, an optimum throughput range, a client software, obstructions such as foliage, buildings, and the like.

According to an example, once the data aggregator 162 inputs the real-time access point data from the plurality of sources, the data aggregator 162 may normalize the real-time access point data to generate a network analytic record. The data aggregator 162 may output the network analytic record to the device analyzer 164, for instance, to join the real-time access point data using a structured query language (SQL) on a unique identifier (e.g., an access point media access control (MAC) address) to display insights into access point performance on the graphical user interface 200.

Referring to FIG. 2, the graphical user interface 200 may display geographical and performance insights output from the device analyzer 164 for access points in a network. For instance, the geographical location information may be displayed in a geographical window 210 and the access point performance information may be displayed in a performance window 220. As shown in the example of FIG. 2, the device analyzer 164 may provide insights regarding the dependent variables of throughput 230, latency 240, and signal strength 250 for the access points in the network. For example, a user may select a region (e.g. region 1) from a plurality of regions on the right-side panel of the geographical window 210 to visualize access points in the selected region. Further, the user may select a location category (e.g., commercial/business) from a plurality of categories on the right-side panel of the performance window 220. The performance window 220 may then display a zoomed view of the performance of access points in region 1 that pertain to the commercial/business location category.

According to an example, the performance window 220 may display insights generated by the device analyzer 164 regarding the dependent variables of throughput 230, latency 240, and signal strength 250 to differentiate the network performance of the access points (e.g., latency between 1 ms to 500 ms may be classified in the 'Good' range, while latency >2000 ms may be classified in the 'High' range). Thus, the device analyzer 164 may determine underperforming access points based on the real-time access point data input from the data aggregator 162. The underperforming access points may be access points classified in the high latency range. Based on these ranges, the access points may be plotted vis-à-vis their longitude and latitude information in the performance window 220. According to an example, throughput performance may be depicted by a size of an access point's circle, latency performance by the color of an access point's circle, and signal strength, which is averaged over a zip code region, by the color of a zip field for the access point based on a legend on the left-hand panel of the performance window 220. Thus, the performance window 220 may be zoomed in, panned, and access points from different regions compared by using the performance window and filter controls on the right-side panel.

Referring to FIG. 3, the graphical user interface 300 may also display a descriptive comparison analysis that is output from the device analyzer 164 for the access points in the network. For instance, access point comparison information that is generated and output from the device analyzer 164 may be displayed in the graphical user interface 300 as a report. As shown in FIG. 3, the dependent variables of throughput, signal strength, and latency may be plotted vis-à-vis a connection success rate for selected access points in respective windows 310-312. The selected access points may, for example, be underperforming access points in the network. Additionally, the dependent variables of throughput, signal strength, and latency may be plotted vis-à-vis a connection success rate for selected regions in respective windows 320-322. Therefore, the graphical user interfaces 200 and 300 allow a user to drill-down to visualize insights, such as underperforming access points, as identified by the device analyzer 164.

According to an example, the wireless network analytic record may be built through an in-depth understanding and analysis of each attribute across the plurality of data sources. Industry or functional enrichment may transform a common attribute and link all of the plurality of data sources. At an aggregation point, a data profile may treat outliers by removing erroneous values that may skew the optimization regression analysis. After building the wireless network analytic record and generating insights about the performance of the selected access points, statistics or advanced modeling techniques may provide optimization solutions to the underperforming access points according to an example. For instance, the predictive modeler 166 may execute machine learning operations on the real-time access point data from the wireless network analytic record to identify and resolve the causes or reasons (e.g., independent variables) for the performance of the underperforming access points (e.g., dependent variable). In this regard, the predictive modeler 166 may analyze the independent variables that impact the performance of the underperforming access points as calculated by the device analyzer 164.

According the example of FIG. 3, the device analyzer 164 may prepare and validate the dependent and independent variables to pass to the predictive modeler 164 to create a model to forecast the performance of the underperforming access points. For example, the device analyzer 164 may determine that the performance (e.g., connection success rate) of the selected access points is strongly related to latency as shown in window 312. Therefore, the device analyzer 164 may calculate that latency is a dependent variable for the performance of the selected access points. Moreover, the device analyzer 164 may calculate independent variables that impact the latency of the selected access points from a set of independent variables. That is, the dependent variable may be mapped to each independent variable from the set of independent variables to determine whether the independent variables are logarithmically or exponentially related to the latency of the selected access points.

Figure 4A:
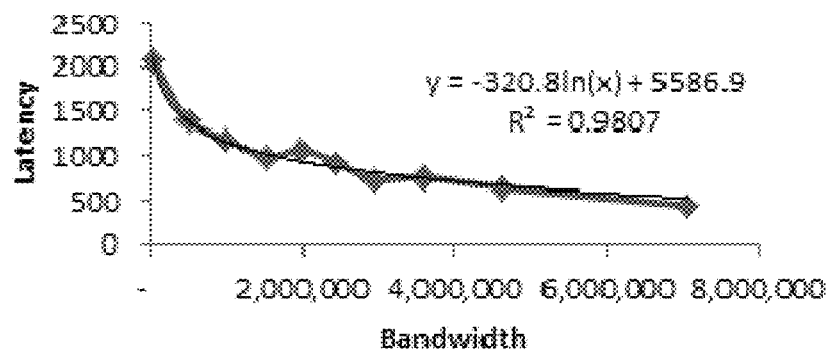
FIG. 4A shows a plot diagram of a dependent variable of latency mapped to an independent variable of average bandwidth, according to an example of the present disclosure.

FIG. 4A shows a plot diagram 400 of the dependent variable of latency mapped to an independent variable of average bandwidth according to an example of the present disclosure. In FIG. 4A, the plot diagram 400 indicates that the average bandwidth is logarithmically related to latency based on a regression equation. In other words, the average bandwidth shows a clear trend when mapped with latency. Therefore, the device analyzer 164, for example, may transform the independent variable of average bandwidth and then output the transformed independent variable to the predictive modeler 156 to predict and explain the performance of the selected access points. Transforming the independent variable may include treating the variable for outlier values (e.g., floor and cap at minimum and maximum values) and missing values so that the independent variable may be standardized and inserted into a regression model without errors (e.g., non-zero if a reciprocal transformation is recommended or non-negative if executing a log transformation).

Figure 4B:
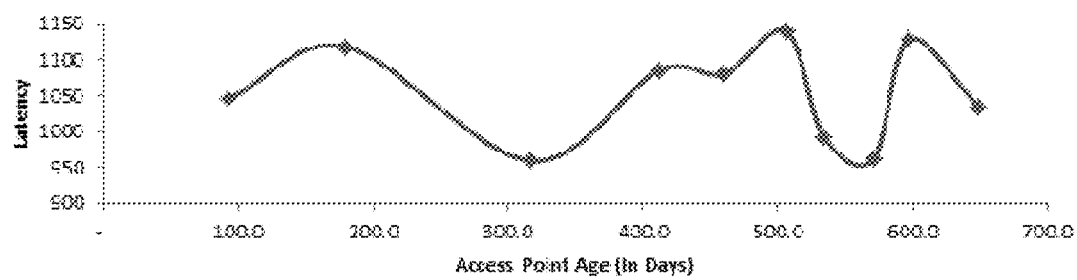
FIG. 4B shows a plot diagram of a dependent variable of latency mapped to an independent variable of an age of the equipment according to an example of the present disclosure.

On the other hand, FIG. 4B shows a plot diagram 450 of the dependent variable of latency mapped to an independent variable of an age of the equipment according to an example of the present disclosure. In FIG. 4B, the plot diagram 450 does not indicate that the age of the equipment shows a clear trend when mapped with latency. Therefore, the device analyzer 164, for example, may drop the independent variable of the age of the equipment. That is, the independent variable of the age of the equipment is not output to the predictive modeler 156 for further analysis.

Thus, the device analyzer 164 may calculate a selection of the trending independent variables from the set of independent variables and output the selection to the predictive modeler 166 to predict the connection latency of the selected access points. The independent variables represent the tested inputs or causes for the performance of access points. For example, the independent variables may be factors in causing the effect of the dependent variable (e.g., connection latency) for the selected access points. The independent variables that relate to the performance of an access point may include values for data transmission and reception, access point installation, connected sessions, bandwidth and throughput, networks, access point hardware and software, wireless device operating systems, and obstruction data. For instance, a selection of the following independent variables listed in Table 1 may be transmitted from the device analyzer 164 to the predictive modeler 166 for a statistical forecasting.

FIG. 5 shows an output 500 for an initial iteration of a regression analysis on a first model with latency as the dependent variable, according to an example of the present disclosure. The output 500 may include an observation section 510 including items such as a number of observations read from an inputted data set, a number of observations used in fitting the first model, and a number of observations with missing values.

TABLE 1

| No. | Variable Name | Description |
| --- | --- | --- |
| 1 | avg_rx | Average data (in packets) received by the access point |
| 2 | avg_tx | Average data (in packets) transmitted by the access point |
| 3 | no_of_days | Time since the access point was installed (in days) |
| 4 | count_session | No. of sessions connected to the access point in a certain time period |
| 5 | avg_session_durtn | The average of session time for all connected devices at the access point in a certain time period |
| 6 | avg_bw | The average bandwidth of the access point connections |
| 7 | wgt_avgrxThrpt | The weighted average data throughput witnessed by the access point (of packets being received) |
| 8 | wgt_avgtxThrpt | The weighted average date throughput witnessed by the access point (of the packets being transmitted) |
| 9 | avg_sig | The average signal strength of the access point as seen from all devices connecting to the access point |
| 10 | Max_comp_networks | The maximum no. of other networks/access points present in the vicinity of the access point during the time |
| 11 | Min_comp_networks | The minimum no. of other networks/access points available to a device trying to connect to the given access point |
| 12 | Avg_comp_networks | Average competing networks in the vicinity of the access point |
|  | Categorical Variables | Categorical variables are transformed into binary variables so that they may be included into the modeling process |
| 13 | Device_OS | The OS Version of the device |
| 14 | Hardware_Version | The hardware version of the access point |
| 15 | Software_Version | The software and firmware installed in the access point |
| 16 | Antenna_Type | The type of antenna of the access point (aerial/underground/on pole) |
| 17 | building_density | The number of buildings around the access point location (high/medium/low/none) |
| 18 | foliage_density | The trees and natural obstructions around the access point site (high/medium/low/none) |

Based on the inputted selection of trending independent variables, the predictive modeler 156 may generate a model to determine an impact ranking for the selected independent variables. For example, the impact ranking may sequence the independent variables according to their impact on the dependent variable of latency. The statistical modeling process executed by the predictive modeler 156 may be implemented to arrive at a best fit model which solves all constraints.

According to an example, the predictive modeler 156 may perform a regression analysis to produce an equation that will predict a dependent variable using one or more independent variables. This equation may have the form of $Y=b_1X_1+b_2X_2+\ldots+A$, where Y is the dependent variable (e.g., latency) that is being forecasted; $X_1$, $X_2$, and so on are the independent variables used to forecast the dependent variable; and $b_1$, $b_2$, and so on are the coefficients or multipliers that describe the size of the effect the independent variables are having on the dependent variable Y; and A is the value Y is forecasted to have when all the independent variables are equal to zero (i.e., the y-intercept). In other words, a best fit model is achieved by checking all possible combinations of the selected independent variables. For instance, different independent variables are included or excluded in a stepwise manner for each iteration to determine if any changes are observed and how the model works compared to the an earlier iteration. The output of the predictive modeler 156 is discussed in greater detail with reference to FIGS. 5-7.

The output 500 may also include an analysis of variance section 520. The items in this section test a hypothesis that none of the independent variables have an effect on the dependent variable. For instance, if there is only one independent variable, it is equivalent to Pr>|t| as shown in the parameter estimates section discussed below. The analysis of variance section 520 may include the following outputted items:

Source: The source of variation of the data (e.g., the model, error, or corrected total).

DF: The degrees of freedom, which is an internal variable usually of interest only to statisticians.

Sum of Squares: An intermediate calculation only used in later columns.

Mean Square: An intermediate calculation equal to Sum of Squares/DF.

F Value: A calculation equal to the mean square of the model divided by the mean square of the error. In other words, variance explained by the model divided by variance unexplained by the model. This provides a test statistic, which is tested against an F-distribution.

Pr>F: The probability that the coefficients are all equal to zero. In other words, the probability of a Null Hypothesis being true. The Null Hypothesis is where there is no relation possible between the independent variable and the selected dependent variable. This number should be below 0.05.

Root MSE: The root mean squared error. This provides a measure of the fit of the regression line to the data. This number should be small.

Dependent Mean: This is the mean of the dependent variable.

Coeff Var: The coefficient of variation, which is simply the ratio of the root MSE to the mean of the dependent variable. This is used as a unitless measure of the variation of the data. For example, a mean variation of 100 is large if the mean of the dependent variable is 1, but very small if the mean is 10,000.

R-Square: The R-squared value addresses the question: What percentage of the variation in the data is due to the independent variable? This number should be as close to 1 as possible.

Adj R-Sq: The adjusted R-squared value has the same interpretation of the R-squared value, except that it adjusts for how many independent variables are included in the model.

Additionally, the output 500 may also include a parameter estimates section 530. The items in this section provide the parameters of the model. The parameter estimates section 530 may include the following outputted items:

Variable: The name of the independent variable.

Label: The label of the independent variable.

DF: The degrees of freedom, which is an internal variable usually of interest only to statisticians.

Parameter Estimate: An estimate of the coefficient $b_i$.

Standard Error: An estimate of how volatile the estimate of $b_i$ is. The larger the standard error, the less reliable is the Parameter Estimate.

t Value: A test statistic for a t-test. This tests the hypothesis that the parameter is actually equal to zero.

Pr>|t|: A p-value, which can be interpreted as the estimated probability that the parameter is actually equal to zero or further in the opposite direction from the estimate. In other words, the probability of a Null Hypothesis being true. This number should be below 0.05.

Variance Inflation: A variance inflation factor that shows correlation within independent variables. This should be lower than 3.

Referring to FIG. 5, the Variance Inflation, Pr>|t|, and R-Square values are important metrics which need to be studied in the model to confirm its stability and robustness. As shown in the output 500 of the first model in FIG. 5, the Pr>|t| values for wgt_avgtxThrpt, min_comp_networks, and avg_rx surpass the preferred probability that the Null Hypothesis is true (e.g., 0.05). The R-Square value is also relatively low at 0.0507.

FIG. 6 shows an output 600 for a fourteenth iteration of a regression analysis on a fourteenth model with latency as the dependent variable, according to an example of the present disclosure. As shown in the output 600 of the fourteenth model in FIG. 6, the Pr>|t| values for r_min_comp_networks and r_avg_session_drtn surpass the preferred probability that the Null Hypothesis is true (e.g., 0.05). Additionally, the Variance Inflation values for r_avg_rx and wgt_avgtxThrpt surpass the preferred value of 3 in the fourteenth model. The R-Square value of the fourteenth model, however, has increased to 0.1011.

FIG. 7 shows an output 700 for a final iteration of a regression analysis on a twenty-first model with latency as the dependent variable, according to an example of the present disclosure. As shown in the output 700 of the twenty-first model in FIG. 7, the Pr>|t| values for all of the independent variables are within the preferred probability that the Null Hypothesis is true (e.g., 0.05). Additionally, the Variance Inflation values for all the independent variables are below the preferred value of 3 in the twenty-first model. Finally, the R-Square value of the twenty-first model has increased to 0.1146.

Thus, the predictive modeler 166 may generate a best fit or stable and robust model (i.e., the twenty-first model) to forecast latency at the selected access points after performing twenty-one iterations of the regression analysis according to this example. After multiple model iterations, some of the independent variables may be dropped on the basis of statistical checks (e.g., wgt_AvgTxThrpt and r_min_comp_networks) as shown in FIGS. 5-7.

According to an example, once a stable and robust model has been generated by the predictive modeler 166, the coefficients and standard errors for the variables may be recorded and the model may be run on a validation data set. The validation data set may include an in-sample "validating" data set with all of the necessary variables highlighted in Table 1. In-sample indicates the subset of the overall data set available. The overall data set may be cut into a 60:40 or 70:30 ratio and this stratified sample of 40/30% may be used for validating the model performance. The results obtained from running the model on the validation data set should be similar to those observed in a development data set. Development data set includes a "training" data set with all of the necessary variables highlighted in Table 1. This data set may be used to train or develop the model equation. The training data set may be the overall data or 60/70% of the overall data. The predictive modeler 166 may choose this depending on the number of data records available. Moreover, according to another example, the variables used in the generated model are checked again for issues such as multi-collinearity, missing values, and abnormal behavior since these issues could influence the model performance in subsequent stages.

Figures 8, 9:
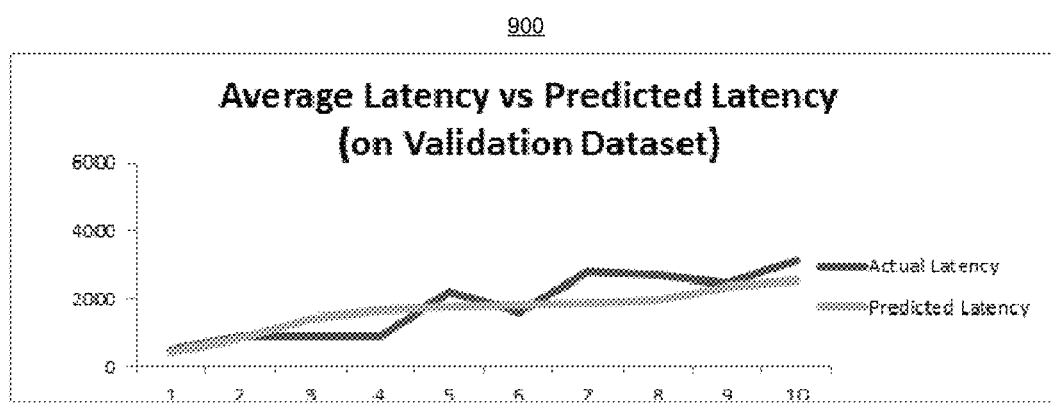
FIG. 8 shows a variable contribution summary, according to an example of the present disclosure.
FIG. 9 shows a validation summary, according to an example of the present disclosure.

Based on the final regression equation of the best fit model, an impact or contribution of each independent variable may be calculated by the predictive modeler 166. In other words, the higher the percentage of contribution to defining the dependent variable, the more significant the independent variable is in impacting the dependent variable. FIG. 8 shows an example of a variable contribution summary 800 according to an example of the present disclosure. The variable contribution summary 800 sequentially ranks the independent variables in order of their impact upon the dependent variable. The impact ranking for the independent variables may, for example, be based upon their respective Parameter Estimate values as shown in FIG. 7. Referring back to FIG. 8, the predictive modeler 166 has determined that the independent variable of bandwidth has the highest impact upon latency based on the regression analysis. That is, the predictive modeler 166 has determined that bandwidth contributes the most to defining latency. According to an example, the variable contribution summary 800 sequentially ranks the independent variables of bandwidth, device operating system (OS), throughput, average session duration, data transferred, and number of session in order of impact upon the dependent variable and may describe the ranked independent variables.

According to an example, a model validation is executed at each iteration of the regression analysis by the predictive modeler 166 to arrive at the robustness and stability metrics. For example, as shown in the validation summary 900 in FIG. 9, the predicted value of latency generated by the predictive modeler 166 is compared with the actual value of latency that is available in the validation data set. For example, the overall data set may be divided into a validation data set through stratified sampling techniques and the model may be validated while developing the model on the validation data set. The model is classified as statistically significant if a rank ordering of the performance of the selected access points on the predicted value shows a similar ranking and trend to the performance of the selected access points on the actual value.

Figure 10:
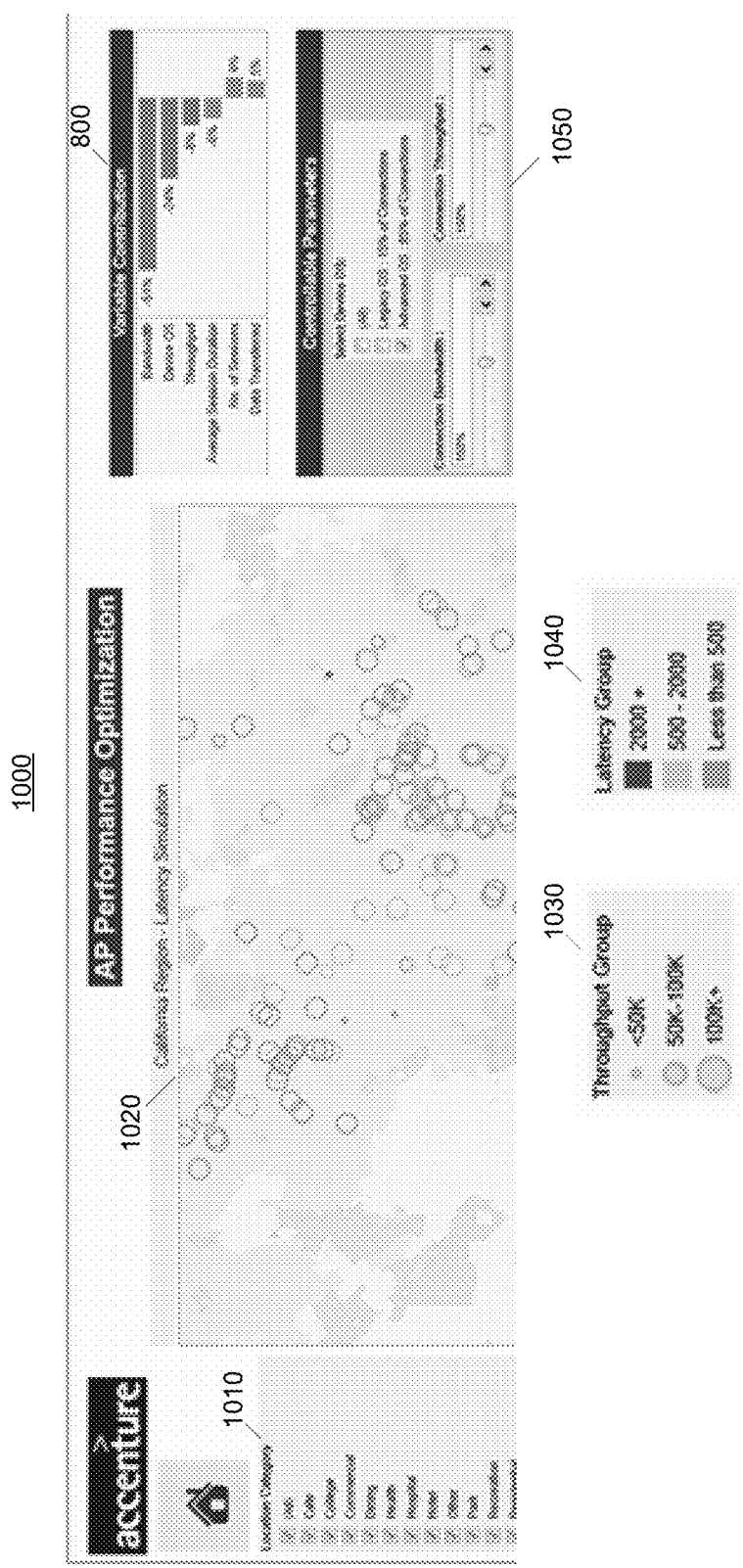
FIG. 10 shows a configuration portal for access point optimization based on top three variable contribution, according to an example of the present disclosure.

FIG. 10 shows a configuration portal 1000, according to an example of the present disclosure. The configuration circuit 168, for instance, may deploy the best fit model for the selected access points on the configuration portal 1000. For example, the configuration circuit 168 may receive a user selection of a geographical region to test the output of the best fit model. A user may drill-down to the region level, the category level, or the access point level. In the example of FIG. 10, the user has selected a California region to test the output of the latency model that was generated by the predictive modeler 166. The configuration portal 1000 may display access points filtered according to location category 1010 for the selected California region in a performance window 1020. According to an example, a throughput group 1030 may be depicted by a size of an access point's circle and a latency group 1040 by the color of an access point's circle as shown in FIG. 10.

According to an example, based on the variable contribution summary 800 outputted from the predictive modeler 166, the configuration circuit 168 may identify one or more independent variables that are assigned a high impact ranking as controllable input parameters 1050 to optimize the performance of the selected access points. That is, the configuration circuit 168 may select independent variables that are key in dictating the latency of the selected access points and may be easily modified from the network end to facilitate improved access point performance. For instance, as shown in FIG. 10, the configuration circuit 168 has selected the independent variables of device OS, connection bandwidth, and connection throughput as the controllable input parameters 1050.

According to an example, the configuration circuit 168 may adjust the controllable input parameters 1050 to optimize the performance of the selected access points. That is, by adjusting the controllable input parameters 1050 of the configuration portal 1000, the respective independent variables are modified to facilitate improved access point performance. As the controllable input parameters 1050 are adjusted by sliders, for example, the improvement in latency may be displayed in real-time in the performance window 1020. Additionally, a user may change the controllable input parameter for a device OS to show how latency changes with different device OS versions.

Figure 11:
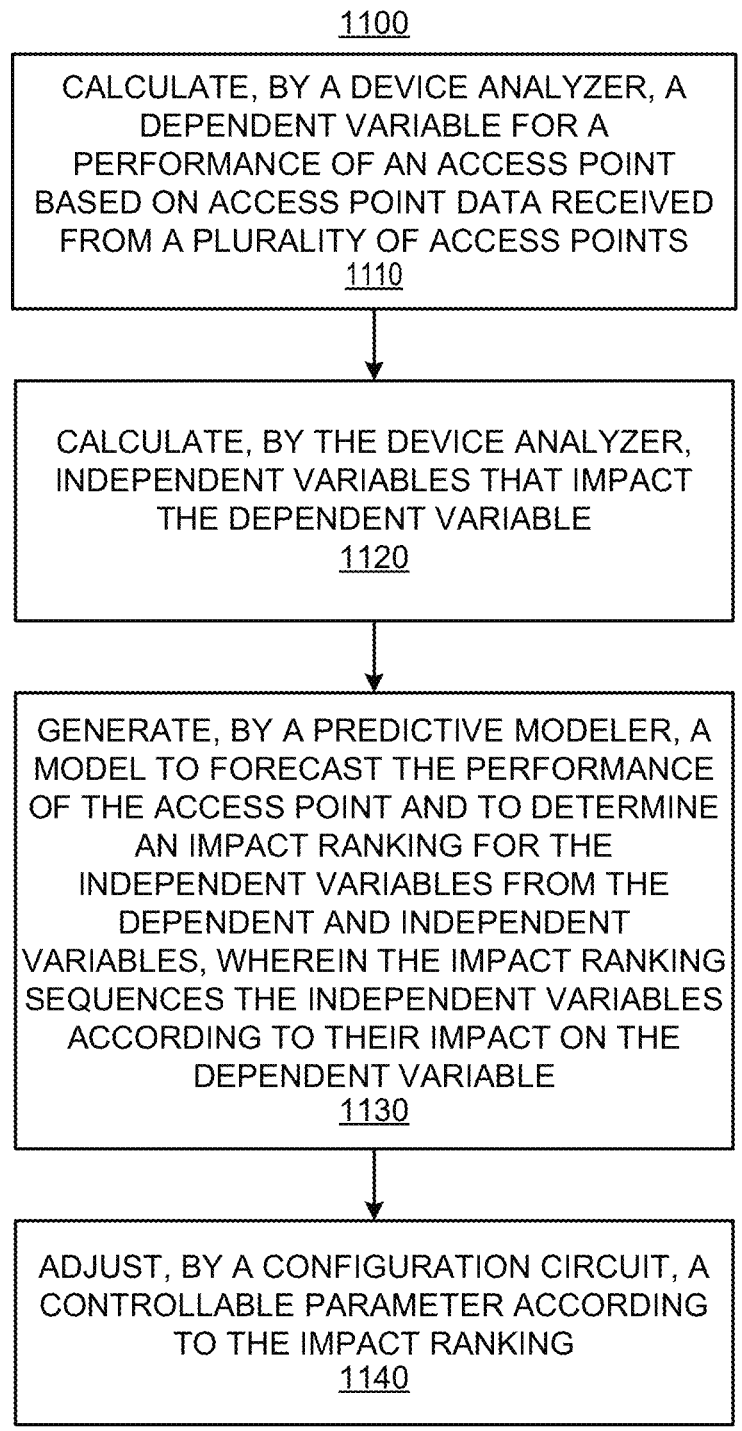
FIG. 11 shows a flow diagram of a method to optimize a performance of an access point in a wireless network based on a statistical ranking of independent variables, according to an example of the present disclosure.
Figure 12:
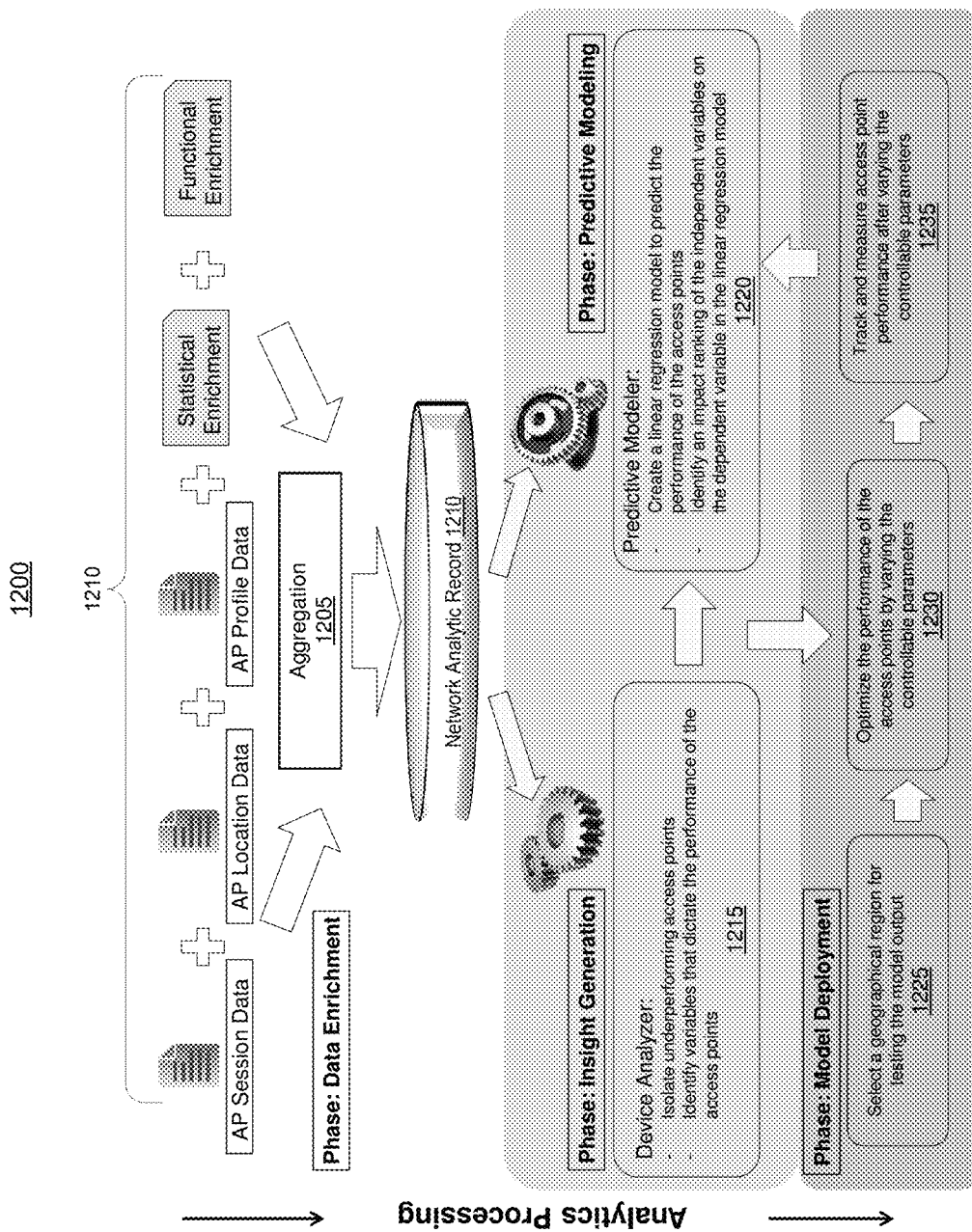
FIG. 12 shows an architectural flow diagram for problem insight generation for underperforming access points and an analytics processing method to optimize a performance of an access point in a wireless network based on a complex and iterative statistical regression analysis of independent variables, according to another example of the present disclosure.

FIGS. 11 and 12 respectively depict flow diagrams of methods 1100 and 1200 to optimize a performance of an access point in a wireless network according to examples of the present disclosure. It should be apparent to those of ordinary skill in the art that the methods 1100 and 1200 represent generalized illustrations and that other operations may be added or existing operations may be removed, modified or rearranged without departing from the scopes of the methods 1100 and 1200. The method 1200 is related to the method 1100 in that method 1200 includes operations in addition to those included in the method 1100. Thus, the method 1200 may be construed as including all of the features discussed with respect to the method 1100.

With reference to FIG. 11, there is shown a flow diagram of a method 1100 to optimize a performance of an access point in a wireless network based on a statistical ranking of independent variables, according to an example of the present disclosure. The method 1100 is implemented, for example, by the processor 152 of the access point management server 150 as depicted in FIG. 1.

In block 1110, the device analyzer 164, for instance, may calculate a dependent variable for the performance of the access point based on real-time access point data received from a plurality of access points. For example, the device analyzer 164 may identify the dependent variable based on computed strength bands (low, medium, and high). That is, based on the real-time access point data, which may include functional enrichment data from a subject matter expert, a plurality of variables relating to the performance of the access point may be selected as input to the device analyzer 164. The device analyzer 164 may compute a strength band for the inputted plurality of variables in relation to the performance of the access point. Accordingly to an example, the device analyzer 164 may identify a variable from the plurality of variables as the dependent variable based on its strength band value.

The device analyzer 164 may then calculate independent variables that impact the dependent variable, as shown in block 1120. The device analyzer 164, for example, may map the dependent variable to each independent variable Table 1 to determine whether each independent variable is logarithmically or exponentially related (i.e., shows a significant trend) to the dependent variable as discussed above in FIGS. 4A and 4B. According to an example, the device analyzer 164 may identify underperforming access points in the wireless network based on a network analytic record determine the dependent variable and the independent variables based on the identification of the underperforming access points. That is, the device analyzer 164 may group the access points within defined strength bands of low, medium, and high that relate to the performance of the access points with respect to the dependent variable (e.g., latency). The device analyzer 164 may then output the calculated variables to the predictive modeler 166 to generate a model.

In block 1130, the predictive modeler 166, for instance, may generate a model to forecast the performance of the access point based on the calculated variables outputted from the device analyzer 164. The model may be generated using a stepwise regression analysis to analyze all combinations of the independent variables, wherein different independent variables are included or excluded in each iteration of the stepwise regression analysis. The predictive modeler 166 may also determine an impact ranking for the independent variables from the dependent and independent variables. The impact ranking may sequence the independent variables according to their impact on the dependent variable.

In block 1140, the configuration circuit 168, for instance, may adjust a controllable parameter according to the impact ranking by the predictive modeler 166. The configuration circuit 168 may adjust the controllable parameter according to a user-selected a geographical region. According to an example, the configuration circuit is to generate an access point instruction, including the controllable parameter, to send to each of the plurality of access points via the interface circuit, and each access point includes a controller to receive the instruction and locally set the controllable parameter according to the instruction. The performance of the access point may be tracked after deploying the adjusted controllable parameter on the model to determine if the model needs to be updated.

With reference to FIG. 12, there is shown a flow diagram of an analytics processing method 1200 to optimize a performance of an access point in a wireless network based on a statistical ranking of independent variables, according to another example of the present disclosure. The method 1200 is implemented, for example, by the processor 152 of the access point management server 150 as depicted in FIG. 1.

In block 1205, the data aggregator 162, for instance, may aggregate and enrich the vast amounts of real-time access point data 1210 that are output from a plurality of data sources. The plurality of data sources may provide, for instance, access point session data, access point location data, access point profile data, statistical enrichment data, and functional enrichment data. The data aggregator 162 may then summarize, transform, and enrich the real-time access point data 1210 to create a network analytic record 1210 for all of the access points in a network, as shown in block 1215.

Based on the network analytic record 1210 generated by the data aggregator 162, the device analyzer 164 may isolate underperforming access points and identify variables that dictate the performance (e.g., connection success rate and quality of connection) of the access points. The device analyzer 164 may then output the identified variables (e.g., dependent variable and independent variables) to the predictive modeler 166 to generate a regression model, as shown in block 1220.

In block 1220, the predictive modeler 166 may create a linear regression model to predict the performance of the access points based on the network analytic record and to identify and resolve the causes or reasons for the underperforming access points. In this regard, the predictive modeler 166 may analyze variables to determine their impact upon the performance of the underperforming access points as calculated by the device analyzer 164. That is, the predictive modeler 166 may generate a variable contribution summary that sequentially ranks the independent variables in order of their impact upon the dependent variable. The predictive modeler 166 may then output the model and the variable contribution summary to the configuration circuit 168 to deploy the model for the selected access points on the configuration portal 1000.

In block 1225, the configuration circuit 168 may select a geographical region to test the output of the model. According to an example, the access points in the selected geographical region may be optimized by adjusting or varying the controllable parameters for the access points, as shown in block 1230. The controllable parameters are based on one or more independent variables that are assigned a high impact ranking in the variable contribution summary, according to an example. That is, the configuration circuit 168 may select independent variables that are key in dictating the performance of the selected access points and may be easily modified from the network end to facilitate improved access point performance.

In block 1235, the configuration circuit 168 may track and measure the performance of the access point after varying the controllable parameters to determine if the model needs to be updated. Thus, according to an example, the predictive modeler 166 may generate an updated model as shown in block 1220, if necessary.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A system to optimize a performance of access points in a wireless network, comprising:
    an interface circuit to connect to a plurality of wireless local area networks (WLANs) and to receive real-time access point data from a plurality of access points in the WLANs, the real-time access point data including access point profile data comprising access point hardware and software information, a data of installation, service data, and connected node information; and
    a processor communicatively coupled to the interface circuit, the processor to execute machine readable instructions, which when executed, cause the processor to:
        calculate a dependent variable for the performance of access points and calculate independent variables that impact the dependent variable based on the real-time access point data received from the plurality of access points;
        generate a model to forecast the performance of the access points and determine an impact ranking for the independent variables from the dependent and independent variables, wherein the impact ranking sequences the independent variables according to their impact on the dependent variable describing the performance of the access points; and
        adjust a controllable parameter of the access points according to the impact ranking, wherein the processor is to generate an access point instruction, including the controllable parameter, to send to each of the access points via the interface circuit, and the access points include a controller to receive the instruction and locally set the controllable parameter according to the instruction.

2. The system of claim 1, wherein the processor is further to:
    normalize the real-time access point data received from the plurality of access points; and
    generate a network analytic record based on an aggregated real-time access point data.

3. The system of claim 1, wherein the processor is further to:
    identify underperforming access points in the WLAN based on a network analytic record; and
    determine the dependent variable and the independent variables based on the identification of the underperforming access points; and
    wherein the processor generates the model using a stepwise regression analysis to test all combinations of the independent variables during multiple iterations of the model.

4. The system of claim 1, wherein the processor is further to:
    adjust the controllable parameter by selecting a geographical region to deploy the model; and
    track the performance of the access points after deploying the adjusted controllable parameter on the model.

5. The system of claim 1, wherein the access point hardware and software information includes an operating system version, and wherein the controllable parameter includes the operating system version.

6. A computer-implemented method to optimize a performance of an access point in a wireless network, comprising:
    calculating, by a processor executing machine readable instructions, a dependent variable for the performance of the access point and independent variables that impact the dependent variable from a set of independent variables based on real-time access point data received from a plurality of access points, the real-time access point data including access point profile data comprising access point hardware and software information, a data of installation, service data, and connected node information;

generating, by the processor, a model to forecast the performance of the access point and determine an impact ranking for the independent variables from the dependent and independent variables, wherein the impact ranking sequences the independent variables according to their impact on the dependent variable describing the performance of the access point; and adjusting, by the processor, a controllable parameter of the access point according to the impact ranking.

7. The method of claim 6, further comprising:

aggregating, by the processor, the real-time access point data from the plurality of access points, the real-time access point data including at least one of access point session data, access point location data, access point profile data, statistical data, and functional data; and generating, by the processor, a network analytic record based on the aggregated real-time access point data.

8. The method of claim 6, wherein the performance of the access point includes at least one of latency, connection success rate for the access point, and quality of connection of the access point.

9. The method of claim 6, wherein calculating the dependent variable and the independent variables further comprises:

identifying, by the processor, an underperforming access point in the network based on a network analytic record; and determining, by the processor, the dependent variable and the independent variables based on the identification of the underperforming access point.

10. The method of claim 6, wherein generating the model includes performing a stepwise regression analysis to test all combinations of the independent variables during multiple iterations of the model; and wherein the dependent variable is latency.

11. The method of claim 6, wherein adjusting the controllable parameter includes selecting a geographical region to deploy the model; and/or tracking the performance of the access point after deploying the adjusted controllable parameter on the model.

12. The method of claim 6, wherein the independent variables are at least two of an average rate of data received at the access point,
an average rate of data transmitted at the access point, a time since the access point was installed,
an average session time for all wireless devices connected to the access point,
an average bandwidth of an access point connection,
a weighted average data throughput received at the access point,
a weighted average data throughput transmitted at the access point,
an average signal strength of the access point,
a maximum number of other access points,
a minimum number of other access points,
an average number of competing networks,
an operating system of the wireless devices,
a hardware version of the access point,
a software and firmware installed in the access point,
a type of antenna of the access point,
a building density, and
a foliage density.

13. The system of claim 6, wherein the access point hardware and software information includes an operating system version, and wherein adjusting the controllable parameter of the access points includes changing the controllable parameter for the operating system version.

14. A system to optimize a performance of an access point in a wireless network, comprising:

a processor executing machine readable instructions, wherein executing the machine readable instructions causes the processor to:

normalize real-time access point data received from a plurality of data sources and generate a network analytic record based on the normalized real-time access point data, the real-time access point data including access point profile data comprising access point hardware and software information, a data of installation, service data, and connected node information;

calculate, based on the received real-time access point data, a dependent variable corresponding to the performance of the access point and to calculate independent variables that impact the dependent variable;

generate a model to forecast the performance of the access point and to determine an impact ranking for the independent variables from the dependent and independent variables, wherein the impact ranking sequences the independent variables according to an impact of the independent variables on the dependent variable; and adjust a controllable parameter of the access point according to the impact ranking.

15. The system of claim 14, wherein the processor is further to:

identify an underperforming access point in the wireless network based on the network analytic record; and determine the dependent variable and the independent variables based on the identification of the underperforming access point; and wherein the processor generates the model using a stepwise regression analysis to test all combinations of the independent variables during multiple iterations of the model.

16. The system of claim 14, wherein the processor is further to adjust the controllable parameter by selecting a geographical region to deploy the model; and/or track the performance of the access point after deploying the adjusted controllable parameter on the model.

17. The system of claim 14, wherein the access point hardware and software information includes an operating system version, and wherein the controllable parameter of the access point includes the operating system version of the access point.

18. A non-transitory computer readable medium comprising computer-readable instructions, which, when loaded and executed on a computer system, cause the computer system to:

calculate a dependent variable for the performance of the access point and independent variables that impact the dependent variable from a set of independent variables based on real-time access point data received from a plurality of access points;

generate a model to forecast the performance of the access point and determine an impact ranking for the independent variables from the dependent and independent variables, wherein the impact ranking sequences the independent variables according to their impact on the dependent variable describing the performance of the access point; and adjust a controllable parameter of the access point according to the impact ranking.

* * * * *